United States Patent Office 3,476,751
Patented Nov. 4, 1969

3,476,751
PREPARATION OF 3,3' - ETHYLENEBIS (TETRA-HYDRO-4,6 - DIMETHYL-2H-1,3,5-THIADIAZINE-2-THIONE
William C. Miller, Baytown, and William R. Trutna, Pasadena, Tex., assignors to E. I. du Pont de Nemours and Company, Wilmington, Del., a corporation of Delaware
No Drawing. Filed Dec. 11, 1967, Ser. No. 689,344
Int. Cl. C07d 93/26; A01n 9/22
U.S. Cl. 260—243
13 Claims

ABSTRACT OF THE DISCLOSURE

The fungicidal compound 3,3'-ethylenebis(tetrahydro-4,6-dimethyl-2H-1-3,5-thiadiazine - 2 - thione) is prepared by reacting acetaldehyde, an ammonium salt such as ammonium sulfate, and a salt of ethylenebisdithiocarbamic acid such as the disodium salt, at a temperature between 30 and 55° C. and in the presence of a non-reactant salt such as sodium chloride, the total concentration of ammonium salt and non-reactant salt being between 7 and 20 percent by weight, based on the total weight of reaction components.

BACKGROUND OF THE INVENTION

The compound 3,3'-ethylenebis(tetrahydro-4,6-dimethyl-2H-1,3,5-thiadiazine-2-thione, a fungicide, is disclosed and claimed in Cummins U.S. Patent No. 3,085,046. A method of preparing the compound is also disclosed in that patent. An improved method of preparing the compound is disclosed and claimed in Cummins U.S. Patent No. 3,299,056. However, the product of the process disclosed in both of these patents has a particle size sufficiently large to require extensive milling to achieve an average particle size of about 5 microns, at which size optimum biological activity is demonstrated.

We have discovered a process for preparing 3,3'-ethylenebis(tetrahydro - 4,6 - dimethyl-2H-1,3,5-thiadizine-2-thione) which results in most of the product having a particle size below 7.9 microns and within the optimum biologically active range. As a result the product of this invention can be used to control fungus without first subjecting the product to extensive and rigorous grinding.

SUMMARY OF THE INVENTION

In summary, this invention consists in an improvement in the process of preparing 3,3'-ethylenebis(tetrahydro-4,6-dimethyl-2H-1,3,5-thiadiazine-2-thione) by the reaction of acetaldehyde, an ammonium salt and a salt of ethylenebisdithiocarbamic acid at a temperature between 30 and 55° C., said improvement comprising carrying out the reaction in the presence of a non-reactant salt, the total concentration of ammonium salt and non-reactant salt being between 7 and 20 percent by weight.

DESCRIPTION OF THE INVENTION

As pointed out above, both U.S. Patents No. 3,085,046, and No. 3,299,056 disclose the preparation of 3,3'-ethylenebis(tetrahydro - 4,6 - dimethyl-2H-1,3,5-thiadiazine-2-thione) by the reaction of acetaldehyde, an ammonium salt and a salt of ethylenebisdithiocarbamate.

Our invention lies in the discovery that by carrying out such a reaction in the hereinafter described brine solutions, a product is obtained which has enhanced biological activity as compared with the product made in the absence of the brine solution.

Reaction components

The reactants to be used in the process of this invention are acetaldehyde, an ammonium salt and a salt of ethylenebisdithiocarbamic acid. In addition, there is used a non-reactant salt such as sodium chloride and ordinarily a solvent or diluent such as water.

The acetaldehyde suitable for use in this invention can be prepared by any of the methods well-known to the art or can be obtained commercially from a number of sources. It can be used in either the anhydrous form or as an aqueous solution.

The ammonium salts suitable for use in this invention are the salts of ammonia and a strong acid. Representative of these are ammonium chloride, ammonium sulfate, ammonium acid sulfate, ammonitum nitrate, ammonium formate, ammonium bromide, ammonium phosphate, and ammonium acetate. The use of ammonium chloride is advantageous from an economic standpoint but ammonium sulfate is more preferred because of its economic availability as well as its desirable chemical properties such as its non-corrosive nature. These salts can be prepared by methods well-known to the art or from numerous commercial sources.

Suitable salts of ethylenebisdithiocarbamic acid are the sodium salt, hereinafter called nabam, the ammonium salt, hereinafter called ammobam, the potassium salt and the mixed sodium-ammonium salt. Of these, nabam is preferred although ammobam and its mixed salt offer the advantage of markedly reducing or eliminating the need for the above described ammonium salt. These salts can be prepared by methods well-known to the art such as by reaction of a molar equivalent of a primary amine with two molar equivalents of an alkali hydroxide and two molar equivalents of carbon disulfide in water or a lower alcohol.

The non-reactant salts suitable for use in this invention include sodium chloride, sodium carbamate, sodium sulfate, sodium nitrate, sodium acetate, monobasic sodium phosphate, potassium sulfate, potassium chloride, magnesium sulfate and calcium chloride. For reasons of greatest convenience and economy, salts such as sodium chloride and magnesium sulfate are preferred and sodium chloride is most preferred.

Suitable solvents include water and organic solvents such as dioxane and lower alcohols. Water is the preferred solvent for reasons of convenience and economy.

Reaction conditions

The amounts of reactants to be used in the process of this invention correspond closely to those amounts disclosed in U.S. Patent No. 3,299,056.

Thus the ammonium salt is ordinarly used in an amount slightly in excess of the stoichiometric amount based on the salt of ethylenebisdithiocarbamic acid. Preferred amounts are 15 to 50 percent excess on such a basis. However, amounts as high as 300 to 500 percent excess can be used without detracting from the reaction, and amounts of from 75 to 400% excess are preferred under unusual conditions as described below. Oridinarily it is most convenient to use the ammonium salt in the form of an aqueous solution, at concentrations of from 5 to 40 percent by weight.

The acetaldehyde is also used in slight excess over stoichiometric based on the salt of ethylenebisdithiocarbamic acid. From theoretical up to 100 weight percent excess can be used and 40 to 60 weight percent excess is preferred.

The amount of solvent which is used can vary over a wide range. When water is used as a solvent, it is preferred that it be used in amounts such that there is present from 750 to 5000 grams of water per gram mole of carbamic acid salt. Preferably there is present from 2,000 to 3,000 grams of water per gram mole of carbamic acid salt. The water can be introduced at any of four points in the process. Thus, it can be introduced as follows: as the ammonium salt solvent; with the acetaldehyde; as the non-reactant salt solvent; and with the carbamic acid salt.

The non-reactant salt is used in amounts such that there is present in the reaction mass a concentration of ammonium salt and non-reactant salts of from 7 to about 20 percent based on the total weight of solution. While concentrations in excess of 20 percent give a fine product, yields are adversely affected. Preferred amounts of non-reactant salt for reasons of convenience and economy are amounts below the saturation limit of the solvent. Generally speaking from about 12 percent to about 19 percent total of reactant and non-reactant salts give the most outstanding results.

The process of this invention is ordinarily carried out by dissolving the ammonium salt and the non-reactant salt in water, agitating the reactants while adding to this solution the acetaldehyde, and at the conclusion of the reaction between acetaldehyde and the ammonium salt the carbamic acid salt is added.

During reaction of the acetaldehyde and ammonium salt considerable heat is evolved. This reaction is ordinarily cooled to a temperature below 40° C. to preclude excessive loss of acetaldehyde.

The carbamic acid salt can be added immediately after the above reaction is complete or it can be added after considerable time has elapsed. Good agitation is maintained during addition of this salt to avoid local heating and to minimize excessive concentration of reactants. The rate of admixture depends upon particular reactants, batch size, equipment, cooling means and other process variables but addition is ordinarily concluded in from 15 minutes to 24 hours, and preferably in from 30 minutes to 4 hours. During reaction, the temperature is maintained between 30 and 55° C. Lower temperatures results in yield loss and poor product stability while higher temperatures tend to cause undesired decomposition.

While the above order of addition is preferred the bis-dithiocarbamate salt can be added to the ammonium salt-non-reactant salt solution followed by addition of the acetaldehyde and such order of addition may even be preferred under some circumstances.

Another order of addition which is advantageous is the simultaneous addition of the reactant salt, non-reactant salt and carbamic acid salt to a heel of acetaldehyde and reactant salt. The rate of addition is controlled so that there is maintained in the reactor a concentration of reactant and non-reactant salt of between 7 and 20 percent by weight. Such an addition results in outstanding yields and a fine particle size product of good stability.

At the conclusion of the reaction a precipitate is obtained which can be readily recovered by filtration. Excellent yields such as 95 to 99% or more of pure product are obtained.

The product thus obtained is 3,3'-ethylenebis-(tetrahydro-4,6-dimethyl-2H-1,3,5-thiadiazine-2-thione) having a particle size such that about 10 to 35 weight percent of the product is smaller than 3.1 microns and about 55 to 100 weight percent of the product is smaller than 7.9 microns, the particle sizes being determined by use of an Andreason Pipette. Such a product demonstrates exceptional biological activity. The product obtained using the preferred reactants and conditions of this process will contain more than 15 percent by weight of particles smaller than 3.1 microns and more than 70 percent by weight of particles smaller than 7.9 microns.

Filtration can be carried out by any conventional and convenient means such as by drum filter, filter press, or other means. The filtration can be by gravity or under vacuum as desired. The filter cake can be dried by various means such as by tray or spray methods, or by extrusion into noodles or pellets for further dehydration as in a tunnel dryer or the like.

The filtrate can be treated to recover unreacted acetaldehyde which can be recycled into the process described above or used to precipitate and recover unreacted carbamic acid salts using known techniques. The filtrate can also be recycled to utilize the excess reactant salts and the non-reactant salts.

If the filter cake is extruded, it is sometimes advantageous to admix with the reaction slurry, prior to filtration, from about 0.5 to about 3.5 percent by weight of a clay such as a swelling sodium montmorillonite, which strengthens the extrusions during drying.

By the improvement of this invention, i.e., preparing the product in the presence of a high concentration of salt a product is obtained which does not require costly and extensive milling to achieve high biological activity. As will be observed, excess amounts of ammonium salts are not actually "reactants" to the extent that they are in excess. Thus they can be viewed as "non-reactant" salts and when present in excesses of from 75 to as high as 500 percent or more contribute the effect of the required concentration of both ammonium and "non-reactant" salt. However, as will be readily apparent, a convenient and economic practice of this invention is obtained when sodium chloride is used in amounts to yield a saturated solution.

This invention is further illustrated in the following examples wherein parts and percentages are by weight unless otherwise noted.

Example 1.—An essentially saturated solution of 105.5 parts of ammonium sulfate (40 percent excess) and 259 parts of sodium chloride in 803 parts of water is placed in a reaction vessel equipped with a thermometer, agitator, pressurized dropping funnel and a Dry Ice/acetone-cooled reflux condenser. To this solution 156 parts of acetaldehyde (55 percent excess) are added through the dropping funnel in less than 15 minutes. The temperature is maintained at about 40–44° C. during this addition and during the subsequent addition of 650.5 parts of a 22.5 percent aqueous solution of nabam. The nabam addition is completed in 60 minutes after which the product is removed by filtration, is washed with water and is dried to constant weight in a circulating air oven at 85° C. The concentrations of ammonium sulfate and sodium chloride in the total reactant charge are 5.3 and 13.1 percent by weight respectively.

The product is 195.2 parts (97.6 percent of theory) of a white powder which is 96.3 percent 3,3'-ethylenebis (tetrahydro - 4,6 - dimethyl - 2H - 1,3,5 - thiadiazine - 2-thione) as measured by $CS_2$ evolution. These figures correspond to a 94 percent yield of pure product of which 23.2 percent by weight is smaller than 3.1 microns in particle size and 98.8 percent by weight is smaller than 7.9 microns as measured by Andreason Pipette sedimentation procedure.

Example 2.—Example 1 is repeated except that the temperature is maintained at 50–55° C. during addition of the nabam. A product consisting of a white powder is obtained in good yield. The strength and particle size analysis correspond closely to those of the product of Example 1.

A repeat of the example maintaining the temperature at 30–33° C. during nabam addition results in a good yield of a similar product.

Example 3.—Example 1 repeated except with the exclusion of the sodium chloride. The concentration of ammonium sulfate in the reactant charge is 6.2 percent by weight. The dry product is composed of 185.6 parts of white powder (92.8 percent of theory) which analyses 99.5 percent by $CS_2$ evolution for an overall yield of 92.3 percent. Analysis of the powder by Andreason Pipette sedimentation procedure shows 3.3 percent by weight of the product is smaller than 3.1 microns in particle size and 36.0 percent by weight is smaller than 7.9 microns in particle size.

*Example 4.*—Example 1 is repeated substituting 70.3 parts of ammonium chloride (15 percent excess) for the ammonium sulfate and using 225 parts of sodium chloride. The concentrations of ammonium chloride and sodium chloride in the total reactant charge are 3.7 and 11.8 percent by weight respectively. One hundred and ninety-two and five tenths parts of dry product are obtained (96.2 percent of theory) which analyses 96.6 percent pure by $CS_2$ evolution for an overall yield of 92.5 percent. Analysis of the powder by Andreason sedimentation procedure shows 15.4 percent by weight of the product is smaller than 3.1 microns and 88.3 percent by weight is smaller than 7.9 microns in particle size.

*Example 5.*—A repeat of Example 4 deleting the sodium chloride, leaves the ammonium chloride concentration in the total reactant charge at 4.2 percent by weight. The results are a slightly lower yield of a product of which 3.3 percent by weight is smaller than 3.1 microns and 26.9 percent by weight is smaller than 7.9 microns in particle size.

*Example 6.*—Example 4 is repeated using 75.5 parts of ammonium chloride (25 percent excess) and 236 parts of sodium chloride. The concentrations of ammonium chloride and sodium chloride in the total reactant charge are 3.9 and 12.3 percent respectively. One hundred and ninety-four and five tenths parts of dry product are obtained (97.1 percent of theory) which analyses 96.3 percent pure by $CS_2$ evolution for an overall yield of 93.5 percent. Analysis of the powder by Andreason sedimentation procedure shows 32.1 percent by weight of the product is smaller than 3.1 microns and 97.3 percent by weight is smaller than 7.9 microns in particle size.

*Example 7.*—Example 1 is repeated substituting 21.5 parts of magnesium sulfate for the 259 parts of sodium chloride. The concentrations of ammonium sulfate and magnesium sulfate in the total reactant charge are 6.1 and 1.2 percent by weight respectively. The product is obtained in 96.5 percent yield of active ingredient based on 98.3% purity obtained analytically by $CS_2$ evolution. Further analysis of the product by Andreason sedimentation procedure shows 11.8 percent of the product is smaller than 3.1 microns in size and 58.7 percent of the product is smaller than 7.9 microns in size.

*Example 8.*—Example 1 is repeated substituting 164 parts of monobasic sodium phosphate for the 259 parts of sodium chloride. The concentrations of ammonium sulfate and sodium phosphate in the total reactant charge are 5.6 and 8.7 percent by weight respectively. The product is obtained in 95.3 percent yield of active ingredient based on 96.4 percent purity obtained analytically by $CS_2$ evolution. Further analysis of the product by Andreasonn sedimentation procedure shows 16.1 percent of the product is smaller than 3.1 microns and 79.8 percent of the product is smaller than 7.9 microns in particle size.

*Example 9.*—A solution of 226.5 parts of ammonium sulfate in 803 parts of water is placed in a pressurized dropping funnel. Six hundred and fifty and five tenths parts of a 22.5 percent aqueous solution of nabam is placed in another pressurized dropping funnel. Both funnels are attached so that their contents can be fed at a controlled rate to a reaction vessel equipped with a thermometer, agitator and Dry Ice/acetone-cooler reflux condenser. The vessel is charged with 156 parts of acetaldehyde. Sufficient ammonium sulfate solution is added to the acetaldehyde to give a concentration of 12.3 percent by weight of ammonium sulfate in the reaction heel. The ammonium sulfate solution and nabam solution are then added to the vessel at such a rate that the 12.3 percent concentration of the ammonium salt is maintained in the reaction mass. The temperature is maintained at 40–44° C. during the reaction after which the product 3,3' - ethylenebis(tetrahydro - 4,6 - dimethyl - 2H - 1,3,5-thiadiazine-2-thione) is recovered by filtration and is water-washed and dried to a constant weight at 85° C. in a circulating air oven. The 198.3 parts of dry product obtained, having a purity of 98.6 percent as analyzed by $CS_2$ evolution, is found to contain 20.1 percent by weight of particles smaller than 3.1 microns and 87.7 percent by weight of particles smaller than 7.9 microns as measured by Andreason Pipette Sedimantation.

*Example 10.*—Example 1 is repeated using 269 parts of sodium chloride instead of 259 parts. The concentrations of ammonium sulfate and sodium chloride in the total reactant charge are 5.3 and 13.6 percent by weight respectively. The active ingredient yield is 95.0 percent based on a product purity of 97.2 percent as measured by $CS_2$ evolution. The product contains 24.3 weight percent of particles smaller than 3.1 microns and 94.3 percent of particles smaller than 7.9 microns.

We claim:

1. In a process for preparing 3,3'-ethylenebis(tetrahydro-4,6-dimethyl-2H-1,3,5-thiadiazine-2-thione) by reacting an ammonium salt with acetaldehyde and a salt of ethylenebisdithiocarbamic acid in a solvent, the improvement comprising carrying out the reaction in the presence of a non-reactant salt, the concentration of ammonium salt and non-reactant salt being between 7 and 20 percent by weight based on the total weight of reaction components.

2. A process of claim 1 wherein the concentration of ammonium salt and non-reactant salt is between 12 and 19 percent by weight based on the total weight of reaction components.

3. A process of claim 1 wherein the non-reactant salt is sodium chloride.

4. A process of claim 2 wherein the non-reactant salt is sodium chloride.

5. A process of claim 3 wherein the sodium chloride is used in an amount sufficient to saturate the reaction mixture.

6. A process of claim 3 wherein the solvent is water.

7. In a process for preparting 3,3'-ethylenebis(tetrahydro-4,6-dimethyl-2H-1,3,5-thiadizine-2-thione) by reacting (1) an ammonium salt selected from the group consisting of ammonium sulfate and ammonium chloride, (2) acetaldehyde, and (3 a salt of ethylenebisdithiocarbamic acid selected from the group consisting of sodium, potassium, ammonium and mixed sodium-ammonium salts, in an aqueous medium, and at a temperature of from 30 to 50° C. the improvement comprising carrying out the reaction in the presence of a non-reactant salt, the concentration of ammonium salt and non-reactant salt being between 7 and 20 percent by weight based on the total weight of reaction components.

8. The process of claim 7 wherein the concentration of ammonium salt and non-reactant salt is between 12 and 19 percent by weight based on the total weight of reactants.

9. A process of claim 7 wherein the non-reactant salt is sodium chloride.

10. A process of claim 8 wherein the non-reactant salt is sodium chloride.

11. A process of claim 9 wherein the sodium chloride is used in an amount sufficient to saturate the reaction mixture.

12. A process for preparing 3,3'-ethylenebis(tetrahydro-4,6-dimethyl-2H-1,3,5-thiadiazine-2-thione) by adding (1) an ammonium salt selected from the group consisting of ammonium sulfate and ammonium chloride (2) a non-reactant salt and (3) a salt of ethylenebisdithiocarbamic acid selected from the group consisting of sodium, potassium, ammonium and mixed sodium-ammonium salts, in an aqueous medium continuously to a heel of acetaldehyde, ammonium salt and non-reactant salt at a temperature of between 30 and 50° C. such that the concentration in the reaction heel of the ammonium and non-reactant salts is maintained between 7 and 20 percent based on the reaction heel.

13. A process of claim 12 in which the concentration of ammonium salt and non-reactant salt in the reaction heel is maintained between 12 and 19 percent by weight.

References Cited
UNITED STATES PATENTS

| | | | |
|---|---|---|---|
| 3,085,046 | 4/1963 | Cummins | 260—243 XR |
| 3,126,378 | 3/1964 | Cummins | 260—243 |
| 3,299,056 | 1/1967 | Cummins | 260—243 |

HENRY R. JILES, Primary Examiner

J. M. FORD, Assistant Examiner

U.S. Cl. X.R.

260—999